United States Patent [19]

Juen

[11] Patent Number: 5,341,220
[45] Date of Patent: Aug. 23, 1994

[54] STILL PICTURE IMAGING APPARATUS HAVING AN IMPROVED AUTOMATIC EXPOSURE CONTROL AND REDUCTION IN POWER CONSUMPTION

[75] Inventor: Masahiro Juen, Yokohama, Japan
[73] Assignee: Nikon Corporation, Tokyo, Japan
[21] Appl. No.: 962,042
[22] Filed: Oct. 15, 1992

Related U.S. Application Data

[63] Continuation of Ser. No. 847,844, Mar. 9, 1992, which is a continuation of Ser. No. 638,356, Jan. 4, 1991, abandoned.

[30] Foreign Application Priority Data

Jan. 8, 1990 [JP] Japan ........................ 2-388
Jan. 19, 1990 [JP] Japan ........................ 2-8364

[51] Int. Cl.$^5$ .................................. H04N 5/238
[52] U.S. Cl. .................................. 348/296; 348/363; 348/299
[58] Field of Search ............ 358/209, 213.19, 228, 358/227, 909, 906; 354/446; 352/141; H04N 5/238

[56] References Cited

U.S. PATENT DOCUMENTS

| | | | |
|---|---|---|---|
| 4,365,272 | 12/1982 | Nagai | 358/228 |
| 4,516,172 | 5/1985 | Miyata | 358/228 |
| 4,558,368 | 12/1985 | Aoki | 358/228 |
| 4,638,350 | 1/1987 | Kato | 358/228 |
| 4,754,333 | 6/1988 | Nara | 358/213.19 |
| 4,760,452 | 7/1988 | Kaneko | 358/213.19 |
| 4,809,076 | 2/1989 | Todaka | 358/213.19 |
| 4,868,667 | 9/1989 | Tani | 358/213.19 |
| 4,975,778 | 12/1990 | Park | 358/228 |
| 5,005,086 | 4/1991 | Iwamoto | 358/227 |
| 5,012,271 | 4/1991 | Nishimura | 358/228 |

Primary Examiner—James J. Groody
Assistant Examiner—Sherrie Hsia
Attorney, Agent, or Firm—Michael N. Meller

[57] ABSTRACT

A still picture imaging apparatus including a photometer amplifier (4) for measuring a photo current flowing into an overflow drain of a CCD imaging device (3), an aperture stop mechanism (2) for adjusting the incident light quantity of the imaging device, and a command unit (8, 9) for producing a command signal to start an imaging operation whereby a light quantity measurement on the basis of the photo current is effected during a non-operated condition of the imaging device and then the imaging operation of the imaging device is started in response to the command signal from the command unit (8, 9). The apparatus further includes an aperture stop control circuit (5) whereby in accordance with a reference value representing an incident light quantity which provides a proper exposure when the imaging device (3) is exposed to light over a predetermined shutter time the aperture stop mechanism (2) is feedback controlled in accordance with a measured light quantity signal from the photometer amplifier (4) in such a manner that the measured light quantity signal becomes equal to the reference value, an aperture stop fixing mechanism (11) for mechanically fixing the aperture stop opening of the aperture stop mechanism (2) under the control of the aperture stop control circuit (5) immediately before the start of the imaging operation in response to a command signal from the command unit (8, 9), and an output control circuit (6) for outputting from the imaging device (3) a video output signal imaged with the predetermined shutter time after the aperture stop opening has been fixed.

4 Claims, 7 Drawing Sheets

STILL PICTURE IMAGING APPARATUS HAVING AN IMPROVED AUTOMATIC EXPOSURE CONTROL AND REDUCTION IN POWER CONSUMPTION

This application is a continuation, of application Ser. No. 847,844, filed Mar. 9, 1992, now abandoned, which is a continuation of application Ser. No. 07/638,356 filed Jan. 4, 1991, now abandoned.

BACKGROUND OF THE INVENTION (1) Field of the Invention

The present invention relates generally to a still picture imaging apparatus applicable to electronic still cameras, particularly such imaging apparatus of the type including an imaging device using charge coupled devices (CCDs) with an overflow drain (OFD), and more particularly the invention relates to an apparatus for performing the measurement of incident light quantity, exposure control, etc., of the imaging device.

(2) Prior Art

With conventional still picture imaging apparatus of the type employing an electronic imaging device, it has been well known that during the photographing operation the quantity of incident light to the imaging device is preliminarily measured by utilizing the imaging device itself without using any separate photometer device.

In this type of still picture imaging apparatus which utilizes its imaging device for light quantity measurement, the signal resulting from the light quantity measurement is utilized for performing automatic feedback control (so-called auto-iris control) of the aperture stop in such a manner that the proper exposure is ensured during the imaging operation performed immediately after the light quantity measurement. The past practice has been such that during the light quantity measuring operation the imaging device is brought into operation as during the imaging operation and also the same aperture stop control as in the case of a video camera for moving pictures is effected to make up the dynamic range thereby taking out a part of the resulting video output signal as a measured light quantity signal. However, this method is disadvantageous in that during the light quantity measuring operation preceding the photographing the imaging device is operated in the like manner as during the photographing to control the exposure and therefore a greater driving power is required. Another disadvantage is that the video output signal detected as a measured light quantity signal is an integrated sampled data in time so that there is a limitation to the operating speed of the auto-iris control and a considerable time is required until the aperture stop is stabilized in such cases as immediately following the closing of the power source and when the exposure condition is changed rapidly.

On the other hand, a method has already been proposed (Japanese Patent Application Laid-Open No. 2-108924; published on Apr. 20, 1990) in which the imaging device is used for the measurement of light quantity. However the method of obtaining information for exposure control from other than a video output signal is such that the imaging device comprises charge coupled devices (CCDs) with an overflow drain (OFD) and photo current flowing into the OFD is detected as a measured light quantity signal. In this method, the imaging device comprises for example a CCD imaging device having a vertical overflow drain structure. During the light quantity measuring operation, a condition is established where the driving for the imaging operation including the charge transfer operation, etc., of the imaging device is entirely stopped. That is, all the bias voltages for the imaging device are cut off. In this condition, in response to an image of an object formed on the photosensitive section of the imaging device, a photo current flowing into the overflow drain (the CCD substrate) from the photodiodes constituting the CCD photosensitive picture elements is measured. This is used as a measured light quantity signal which is utilized in the automatic exposure control for determining the desired amount of exposure at that time.

In accordance with this method, however, there still exists a problem that if the photo current flowing into the overflow drain during the time interval from the light quantity measuring operation to the imaging operation and during the imaging operation is varied, the opening of the aperture stop cannot maintain the state at the time of the light quantity measurement. Thus, the exposure control becomes unstable. There exists still another problem that where the light quantity measuring operation for the next imaging is started after the completion of the current imaging operation, even if the operation of the imaging device is cut off, the charges stored in the capacitance components of the various circuit portions connected to the imaging device are left. Therefore, the next light quantity measuring operation cannot be started until these charges have been discharged completely thus giving rise to a problem for the imaging in a continuous shooting mode.

SUMMARY OF THE INVENTION

It is the primary object of the present invention to provide a still picture imaging apparatus which realizes a practical and improved exposure control utilizing a light quantity measuring method adapted to use charge coupled devices or CCDs with an overflow drain or OFD for the previously mentioned imaging device to detect a photo current flowing into the OFD as a measured light quantity signal.

It is another object of the present invention to provide such still picture imaging apparatus which is capable of automatic control for accurately and rapidly obtaining the proper exposure and which is reduced in power consumption.

It is still another object of the present invention to provide such still picture imaging apparatus including a relatively simple mechanism whereby the exposure control condition provided by the light quantity measuring operation is maintained during the imaging operation without power consumption.

It is still another object of the present invention to provide such still picture imaging apparatus which is capable of coming into the light quantity measuring operation for the next imaging in a relatively short period of time after the imaging operation and thus well adapted for the continuous exposure mode.

To accomplish the above objects, in accordance with a basic aspect of the present invention there is thus provided a still picture imaging apparatus of the type including a CCD imaging device with an overflow drain, photometer means for measuring a photo current flowing into the overflow drain of the imaging device, aperture stop means for controlling the quantity of light incident to the imaging device and command means for generating a command signal to start an imaging operation whereby in a condition where the driving for the imaging operation of the imaging device is stopped the photometer means measures the light current and then the driving for the imaging operation of the imaging device is started in response to the command signal from the command means. The apparatus further includes aperture stop control means whereby on the basis of a reference value representing a light quantity of incident light which ensures the proper exposure when the imaging device is exposed to the incident light over a predetermined shutter time the aperture stop means is feedback controlled in accordance with a measured light quantity signal generated from the photometer means in such a manner that the measured light quantity signal becomes equal to the reference value, aperture stop fixing means whereby the aperture stop opening of the aperture stop means controlled by the aperture stop control means is mechanically fixed immediately before the imaging device starts its imaging operation in accordance with the command signal from the command means, and output control means for detecting from the imaging device a video output signal produced with the predetermined shutter time after the fixing of the aperture stop opening.

In accordance with a preferred aspect of the present invention, the still picture imaging apparatus further includes discharge means for forcibly discharging the charges stored in the capacitance portions of the circuits connected to the imaging device when the imaging operation of the imaging device is stopped.

In accordance with another preferred aspect of the present invention, the still picture imaging apparatus further includes aperture stop opening detecting means for detecting the aperture stop opening of the aperture stop means. In this case, with respect to a plurality of predetermined set shutter times, the aperture stop control means is provided with a plurality of predetermined light quantity reference values each corresponding to one of a plurality of incident light quantities each ensuring the proper exposure when the imaging device is exposed to incident light. Also, the aperture stop control means includes selector means whereby when adjusting the opening of the aperture stop means by the aperture stop control means so as to satisfy selected one of the plurality of light quantity reference values corresponding to selected one of the plurality of predetermined shutter times, the preliminarily selected shutter times is changed to another one of the plurality of predetermined shutter times in accordance with an output of the aperture stop opening detecting means. In this way, when the aperture stop opening detecting means generates an output, the opening of the aperture stop means is controlled in such a manner that the measured light quantity signal corresponds to newly selected one of the light quantity reference values that ensures the proper exposure in accordance with the changed newly selected preset shutter time. Also, the output control means performs an operation of detecting a video output signal produced in accordance with the changed newly selected preset shutter time from the imaging device.

In accordance with still another aspect of the present invention, the still picture imaging apparatus further includes signal level detecting means for detecting the magnitude of the video output signal corresponding to at least part of the imaged picture from the video output signal, and shutter time correcting means whereby the current shutter time is used as such when the detected value of the signal level detecting means is within a predetermined proper exposure range and the current shutter time is corrected so as to come within the proper exposure range when the detected value is outside the range. In this case, the output control means detects from the imaging device a video output signal produced in accordance with the corrected shutter time.

By virtue of the above-described construction of the still picture imaging apparatus according to the present invention, the photometer means measures the quantity of incident light from the magnitude of a photo current flowing into the overflow drain so that there is no need to use any exclusive photometric element and therefore there is no problem due to the correlation between a photometric element and the imaging device.

Where a CCD imaging device is used to image a still picture, the optimum sensitivity of the imaging device is fixed and thus the optimum exposure is determined in correspondence to each shutter time. Also, where this type of CCD imaging device is used, the optimum exposure can be determined in terms for example of a value obtained by integrating the quantity of incident light per unit time over a shutter time. As a result, a measured light quantity signal produced by measuring a photo current flowing into the overflow drain of the imaging device is detected in the form of a measured light quantity value per unit time and a reference value for comparison purposes is also given in the form of a similar signal level per unit time.

In accordance with the present invention, the measured light quantity signal (output value) of the photometer means is not one which is sampled in time as mentioned previously. It is a light quantity value directly measured by utilizing the overflow drain. As a result of this fact, it is possible to feedback control the incident aperture stop opening of the imaging device in such manner that the output value attains the reference value thereby ensuring the optimum exposure condition corresponding to the predetermined shutter time.

Then, conceiving a case where the aperture stop control means is realized by an auto-iris mechanism as in the usual cases, in accordance with the present invention it is only necessary to control the auto-iris mechanism by an error signal corresponding to a variation of the output value of the photometer means with respect to the reference value. Thus it is possible to obtain a satisfactorily rapid response by a mechanism which is relatively simple in construction and light in weight.

Further, when imaging a still picture by this imaging apparatus, in order to prevent any erroneous operation of the aperture stop mechanism during the transition to the imaging operation and during the imaging operation and any undesired power consumption, the aperture stop fixing means mechanically fixes the aperture stop or the aperture stop mechanism immediately before the imaging device starting the imaging operation, thereby maintaining constant the aperture stop value during the imaging.

In the still picture imaging apparatus according to the present invention, the aperture stop opening detecting means detects for example the minimum aperture stop opening or the maximum opening (wide-open aperture stop) in accordance for example with the position of a moving member of the aperture stop mechanism.

The result of the detection is utilized in such a manner that if, for example, the overexposure condition still remains even if the aperture stop is closed to the minimum opening, it is utilized to select a shorter shutter time and corresponding to another reference value in accordance with the exposure condition. If, for example, the underexposure condition still exists even if the aperture stop is opened fully, it is utilized to select a longer shutter time and corresponding to another reference value in accordance with the exposure condition.

In this case, when the aperture stop opening detecting means generates a detection output, the predetermined shutter speed is changed and simultaneously the aperture stop control is performed again in accordance with a new light quantity reference value which ensures the proper exposure with the changed new shutter time, thereby finally determining the shutter time and the aperture stop opening which ensure the proper exposure.

Also, in the case of the underexposure condition, when the aperture stop opening detecting means generates a detection output, it may be operated in association with a flash light unit or the like so as to provide an auxiliary illumination in case of need.

Also, there are cases where the aperture stop opening detecting means detects the aperture stop opening at a plurality of points and in such case a plurality of reference values can be determined in accordance with the correlation between the aperture stop opening and the shutter time so as to effect a more precise control.

Further, with the still picture imaging apparatus of the invention including the picture signal level detecting means and the shutter time correcting means, the exposure condition of the picture taken is detected directly from the video output means by the picture signal level detecting means so that if the detected exposure condition is not within the proper exposure range, a correcting operation is accomplished whereby the shutter time is changed by the shutter speed correcting means and the imaging is effected in accordance with the changed shutter time, thereby producing a picture of the proper exposure.

In such case, generally the imaging of a still picture frequently causes an aimed object to be positioned in the central portion of a picture frame and therefore it is desirable to use picture signal level detecting means which detects the magnitude of an output signal corresponding to the central portion of a picture. Depending on the purpose of imaging or the like, however, the detection of a video output signal may be effected at any position other than the central portion of a picture.

The above and other objects and features of the present invention will become more apparent from the following description of preferred embodiments of the invention which are intended for limitation in no way taken in conjunction with the accompanying drawings.

DESCRIPTION OF THE PREFERRED EMBODIMENTS

An embodiment of the present invention will now be described in greater detail with reference to the drawings.

Figure 1:
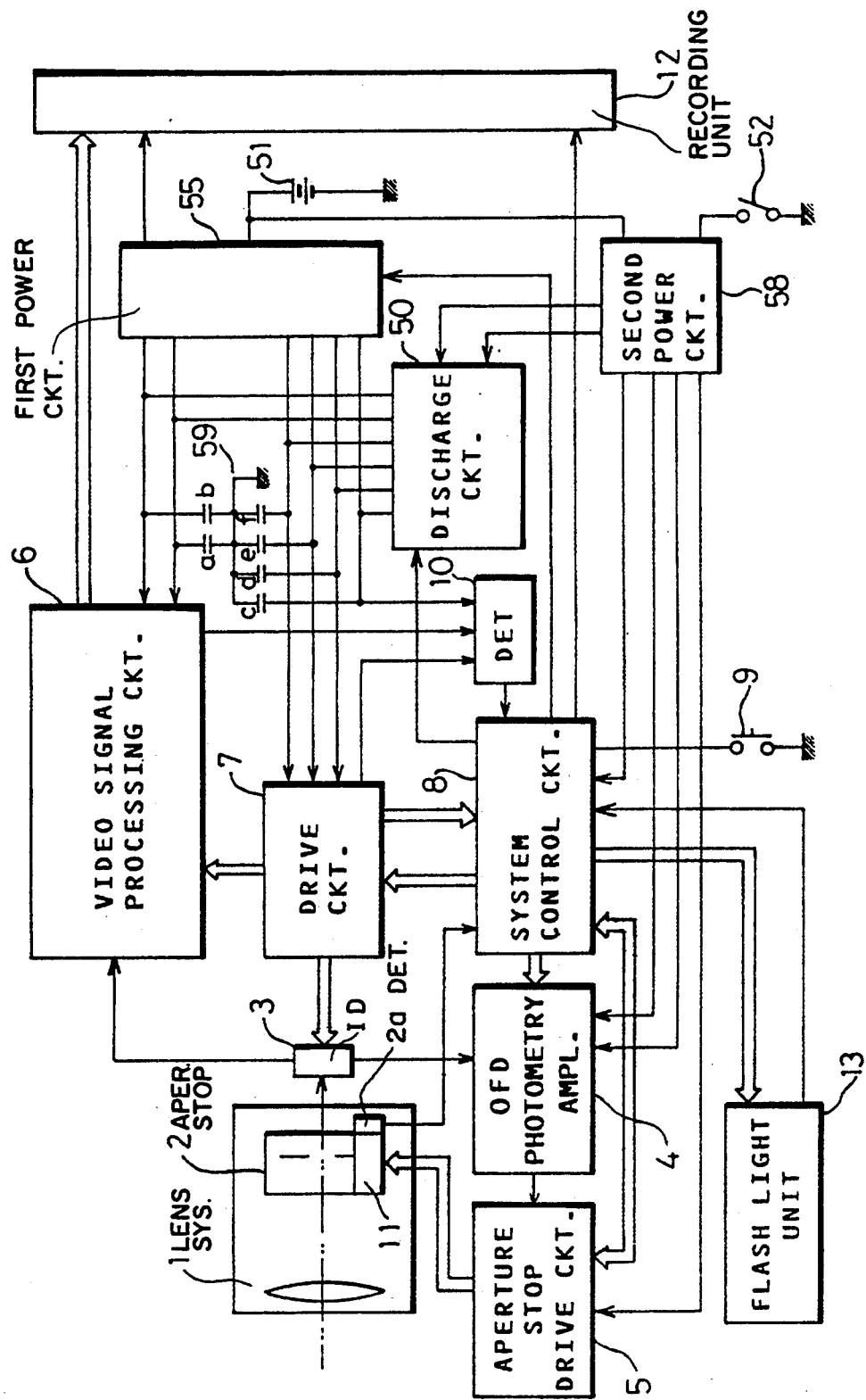
FIG. 1 is a block diagram showing the construction of a still picture imaging apparatus according to an embodiment of the present invention which is applied to an electronic still picture camera.

Referring to FIG. 1, there is illustrated a block diagram showing the overall construction of an embodiment of the invention which is applied to an electronic still picture camera.

In this electronic still picture camera, a lens system 1 focuses an image of an object to be photographed on an imaging device 3 through an aperture stop mechanism 2 having an auto-iris function. The aperture stop mechanism 2 is controlled by an aperture stop drive circuit 5 and includes an aperture stop position fixing mechanism 11 which will be described later.

The imaging device 3 comprises a CCD device having a vertical overflow drain structure in which the overflow drain is composed of the semiconductor substate of the device and is capable of performing an electronic shuttering operation under the control of a drive circuit 7. The imaging device 3 concurrently serves as a photometer device whereby when an image of an object is focused on the photosensitive section of the device with the driving by the drive circuit 7 being stopped altogether or in a completely stopped condition where no bias voltage is applied to the device, the photo current flowing into the overflow drain from groups of photodiodes forming the device photosensitive section in accordance with the light quantity of the object is taken out as a measured light quantity signal from the semiconductor substrate of the imaging device 3 and it is measured by a photometer amplifier 4 which will be described later.

The drive circuit 7 for controlling the operation of the imaging device 3 is supplied with a plurality of different voltages from a first power circuit 55 including a power source battery 51 so as to supply driving pulses to the imaging device 3.

The first power circuit 55 also supplies power to a video signal processing circuit 6 so that the video signal processing circuit 6 receives a picture signal from the imaging device and a desired signal processing is performed on the picture signal, thereby applying a video output signal to a signal recording unit 12. The recording unit 12 records the video output signal on a recording medium such as a magnetic disc by a well known technique. The first power circuit 55 also supplies power to a video level detecting circuit 10 so that the video level detecting circuit 10 discriminates the magnitude of a video output signal generated from the video signal processing circuit 6 and the result of the discrimination is applied to a system control circuit 8.

The system control circuit 8 comprises for example a microcomputer for controlling the operation of the system on the whole and a command signal generated from a trigger switch 9 for commanding the start of the imaging operation or the driving of the imaging device 3 is applied to the system control circuit 8.

A second power circuit 58 is supplied from the battery 51 to supply power to the system control circuit 8 and the photometer amplifier 4. The second power circuit 58 is operated when a switch 52 is closed and its operation is stopped when the switch 52 is opened. On the other hand, when the second power circuit 58 is in operation, the first power circuit 55 is subjected to on-off control in response to the control signal from the system control circuit 8.

In FIG. 1, a circuit 59 including a plurality of grounded capacitors a-f is connected in the feed lines to the drive circuit 7, the video signal processing circuit 6 and the video level detecting circuit 10 from the first power circuit 55. The capacitor circuit 59 is schematically shown to represent for example bias capacitors for noise suppressing purposes and grounded capacitances such as circuit wiring portions, etc. Charges are stored in the capacitor circuit 59 in the feed lines when the first power circuit 55 supplies power to the respective loads. A forced discharge circuit 50, which will be described later, is connected to the feed lines so as to forcibly discharge such charges in a short period of time in response to a command signal from the system control circuit 8. The discharge circuit 50 is supplied from the second power circuit 58 and is controlled by a command signal from the system control circuit 8 so as to perform the forced discharging operation immediately before the start of the light quantity measuring operation in the imaging operation of the imaging device 3.

When the switch 52 is closed so that the power is supplied to the electronic still picture camera, the forced discharging operation is effected first and then the light quantity measuring operation for determining the desired exposure condition is effected prior to the imaging operation. In other words, the second power circuit 58 is brought into operation first so that power is supplied only to the discharge circuit 50, the photometer amplifier 4, the aperture stop drive circuit 5 and the system control circuit 8. The forced discharging operation of the remaining charges on the capacitor circuit 59 and then the measurement of the light quantity incident to the imaging device 3 from the object image through the lens unit 1 are performed. During the interval between the discharging operation and the light quantity measuring operation, the first power circuit 55 is maintained in a non-operative condition by the system control circuit 8 and therefore no driving pulses and bias voltages are supplied to the imaging device 3.

Also, when the system control circuit 8 applies a command signal to the discharge circuit 50 prior to the start of the light quantity measuring operation, the discharge circuit 50 comes into operation for a predetermined fixed time to forcibly discharge the charges on the capacitor circuit 59. As a result, the remaining charges stored in the video signal processing circuit 6 and the drive circuit 7 connected to the respective electrodes of the imaging device 3 are rapidly discharged and eliminated. Thus, any undesired bias voltages for light quantity measurement are not applied to the electrodes of the imaging device. As a result, the imaging device 3 is conditioned to effect a rapid and accurate light quantity measurement.

At this time, the shutter time for imaging purposes is set to a certain initial assumed value selected by the operator and the system control circuit 8 reads from its internal memory control information corresponding to the initial value. The control information includes a plurality of different light quantity reference values each of which satisfies the proper exposure condition for one of a plurality of different shutter speed values. Certain one of the light quantity reference values which ensures the proper exposure in correspondence to the set shutter speed value becomes comparative reference information for determining the desired aperture stop opening in accordance with a detection output from the photometer amplifier 4 which will be described next.

When the time limit for the operation of the discharge circuit 50 is completed so that the light quantity measuring operation is started, in a condition where the imaging operation of the imaging device 3 has been stopped completely as mentioned previously, the light current flowing into the overflow drain of the imaging device 3 is measured by the photometer amplifier 4 in accordance with a command from the system control circuit 8. The system control circuit 8 compares the measured output from the photometer amplifier 4 with the light quantity reference value and it sends a control signal to the aperture stop drive circuit 5 so as to reduce the deviation between the two to zero. The aperture stop drive circuit 5 drives the aperture stop mechanism 2 in accordance with the control signal. Thus, when the aperture stop mechanism 2 changes its aperture stop opening, the magnitude of the measured output of the photometer amplifier 4 becomes equal to the light quantity reference value and therefore the auto-iris operation by a series of feedback controls is accomplished.

Incorporated in the aperture stop drive circuit 5 is a detector 2a for sending separate signals to the system control circuit 8 when the aperture stop mechanism 2 is moved into the wide-open position and the minimum opening position, respectively.

When the system control circuit 8 receives a signal indicative of the wide-open position, the control information corresponding to the initially assumed shutter speed and read from the internal memory is changed to control information corresponding to another shutter speed of a longer time period. When this occurs, an indication of the new shutter speed is made within the finder picture area which is not shown and simultaneously the feedback control of the aperture stop mechanism 2 through the photometer amplifier 4 and the aperture stop drive circuit 5 is again initiated in accordance with the new light quantity reference value in the selected control information, thereby performing the similar auto-iris operation.

Also, when the system control circuit 8 receives a minimum opening signal, the control information read from the internal memory in correspondence to the initially assumed shutter speed is changed to control information corresponding to another shutter speed of a shorter time period. When this occurs, an indication of the new shutter speed is made within the finder picture area which is not shown and the feedback control of the aperture stop mechanism 2 through the photometer amplifier 4 and the aperture stop drive circuit 5 is again started in accordance with the new light quantity reference value in the selected control information, thereby performing the similar auto-iris operation. In this case, if the shutter speed becomes shorter than a predetermined shortest time period, the flash light unit 13 is made ready to emit light and it is prepared to provide an auxiliary illumination during the immediately following imaging operation.

The imaging operation of the electronic still picture camera is started by the trigger switch 9 connected to the system control circuit 8. Preferably, the trigger switch 9 is formed by one of a two-stage switch combined with the switch 52. The two-stage switch is operatively associated with the camera release button so that the switch 52 is closed in response to the first half depression of the release button by the operator and the trigger switch 9 is closed in response to the further depression of the release button by the operator.

When the trigger switch 9 is closed at the start of the imaging operation, immediately before starting the driving of the imaging device 3 by the drive circuit 7, in response to a command signal from the system control circuit 8 the aperture stop drive circuit 5 operates the aperture stop position fixing mechanism 11 so that the aperture stop mechanism 2 is mechanically fixed in the controlled opening position.

The discharge circuit 50 is maintained in its nonoperated condition by a command signal from the system control circuit 8 and then the first power circuit 55 is brought into operation. When this occurs, the power is supplied to the imaging device 3, the drive circuit 7 and the video signal processing circuit 6 and the imaging device 3 is driven with the shutter time determined during the previously mentioned auto-iris operation.

In this case, as mentioned previously, the imaging is effected by causing the flash light unit 13 to emit light as occasion demands so that the video output signal generated from the imaging device 3 is converted to a given signal form by the signal processing circuit 6 and it is then sent to the recording unit 12, thereby storing it as a record of a single picture on the recording medium.

It is to be noted that generally in an imaging device of the type used in an electronic still picture camera, the overflow drain has a single common structure extending all over the whole imaging surface area so that when an imaging device having such overflow drain structure is used, the previously mentioned light quantity measurement brings about a measured light quantity signal corresponding to the average value of the light quantity on the whole imaging surface.

In this case, there is the danger of temporarily causing any defective exposure, partial variations in exposure within an image surface due to a rapid change of the exposure condition or any other cause. While such a rapid change can be dealt with in the case of the measurement and shooting of successive pictures in time such as moving pictures thus permitting the use of the average value light quantity of the whole picture area, the taking of still pictures requires the propriety of the exposure for each of pictures taken and the previously mentioned exposure control based on the measurement of the average light quantity does not necessarily ensure the proper exposure preferable for the taking of still pictures.

Thus, in the electronic still picture camera according to the present embodiment, after the video signal generated from the imaging device 3 has been processed in the video signal processing circuit 6, before sending a video output signal from the video signal processing circuit 6 to the recording unit 12, the magnitude of the video output signal is discriminated by the video level detecting circuit 10 so that when the exposure is improper, the shutter speed is corrected shutter time.

The discrimination of the video output by the video level detecting circuit 10 is such that the discrimination is effected by comparing the magnitude of the video output signal with the previously stored video signal level corresponding to the proper exposure condition. In this case, the taking of a still picture frequently causes a desired object to be positioned in the central portion of a picture area and therefore it is preferable to compare and discriminate the level of the video output signal corresponding to the central portion of the picture area.

Figure 2:
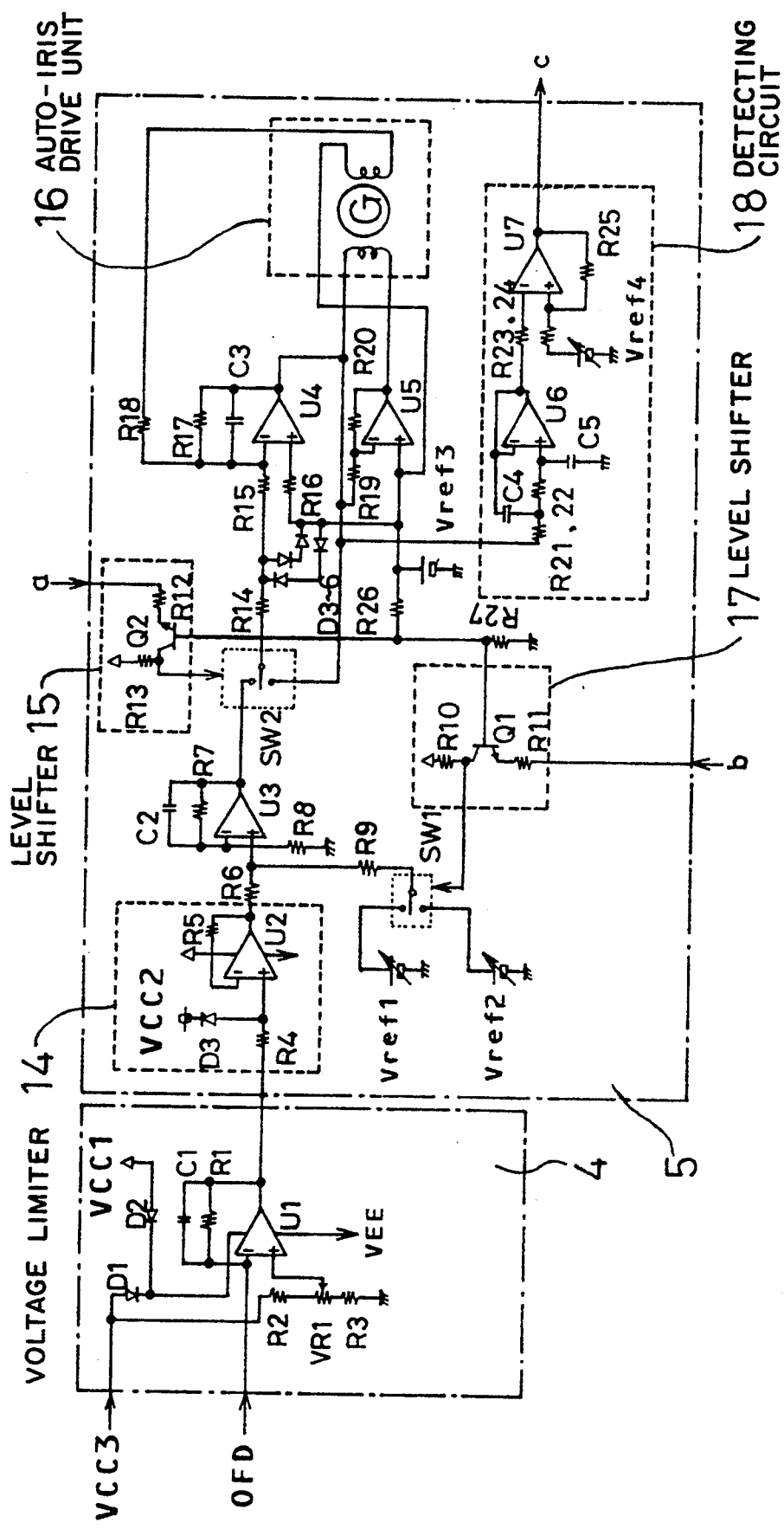
FIG. 2 is a circuit diagram showing a specific example of the photometer amplifier responsive to the overflow drain of the CCD imaging device and the aperture stop drive (auto-iris) circuit.

FIG. 2 is a circuit diagram showing an example of a detailed construction of the overflow drain photometer amplifier 4 and the aperture stop drive circuit 5. In this example, the imaging device comprises an imaging device for ordinary television and its overflow drain has only one current output port.

With this circuitry, in the light quantity measurement condition the power is supplied from the second power circuit 58 only positive to power supply lines $V_{CC1}$ and $V_{CC2}$ and a negative power supply line $V_{EE}$ and a power supply line $V_{CC3}$ is at 0V.

The photometer amplifier 4, designated as $U_1$ is a MOS input operational amplifier (hereinafter referred to as an OP amplifier) and it forms, along with a resistor $R_1$, etc., a current-voltage conversion circuit.

Here, while the overflow drain OFD is connected to the negative input of the OP amplifier $U_1$ so that the light current applied from the OFD to the negative input of the OP amplifier $U_1$ is converted to a voltage signal, the OP amplifier $U_1$ is supplied from the power supply line $V_{CC1}$ through the function of diodes $D_1$ and $D_2$ so that since the power supply line $V_{CC1}$ is 0 volt, no bias voltage is applied to the OFD and also the dark current is within a negligible range, thus making it possible to rapidly and accurately measure the light quantity of the incident light to the imaging device 3.

On the other hand, in the imaging operating condition a positive voltage is supplied to the positive power supply line $V_{CC3}$ and this positive voltage is usually higher than the voltage of the power supply line $V_{CC1}$. Thus, the power is supplied from the line $V_{CC3}$ side to the OP amplifier $U_1$ through the function of the diodes $D_1$ and $D_2$. Also, the voltage applied to the positive input side through resistors $R_2$, $VR_1$ and $R_3$ is applied as a bias voltage to the OFD through the function of the OP amplifier $U_1$ and therefore a blooming suppressing effect is produced on the OFD of the imaging device 3.

Since a higher positive voltage than the $V_{CC2}$ is supplied to the $V_{CC3}$ of the photometer amplifier 4 in the imaging operating condition, a voltage limiter 14 is provided in the first stage of the aperture stop drive circuit 5 so that any excessively high voltage output from the photometer amplifier 4 is prevented from being applied to the part of the aperture stop drive circuit 5 following the voltage limiter 14.

A level shift amplifier is formed by an OP amplifier $U_3$, resistors $R_6$ to $R_9$, etc., which are arranged to follow the voltage limiter 14, so that in response to a reference voltage $Vref_1$ or $Vref_2$ selected by an analog switch $SW_1$ the measured light quantity output is subjected to DC voltage shift and amplified to the required degree of amplification. The selection between the reference voltages $Vref_1$ and $Vref_2$ corresponds to the selection between the assumed shutter times and in this case the number of the assumed shutter times is 2.

While the selection between the assumed shutter speeds may be effected by varying the gain of the OP amplifier $U_3$, to do so results in a change of the loop gain of the whole control system and therefore the selection is effected by shifting the DC voltage level as mentioned above.

Of course, the number of the assumed shutter speeds is not limited to 2 and also the selection of the desired assumed shutter time may be effected by any other method.

The change-over between the assumed shutter times is effected by a change-over signal b from the system control circuit 8. Numeral 17 designates a level shifter for adjusting in level the change-over signal b and the control signal input of the analog switch $SW_1$ to one another.

The output of the OP amplifier $U_3$ is applied to an aperture stop control circuit through an analog switch $SW_2$. The aperture stop control circuit is formed by OP amplifiers $U_4$ and $U_5$, resistors $R_{14}$ to $R_{20}$, etc. The function of the analog switch $SW_2$ will be described later. Numeral 16 designates a part of the electric circuitry of the ordinary auto-iris mechanism. It is of the type including a rotor connected to the aperture stop blades, its driving coil, a damping coil, etc. Thus, the aperture stop is stabilized when the detection signal of the OP amplifier $U_3$ varying in response to the opening and closing of the aperture stop becomes equal to a reference voltage $Vref_3$ through the action of the aperture stop control circuit.

Also, even if either one of the reference voltages $Vref_1$ and $Vref_2$ is selected, the input to the aperture stop control circuit becomes asymmetric with the reference voltage $Vref_3$ with the resulting instabilization of the control characteristics and voltage limiting diodes $D_3$ to $D_6$ are provided to prevent it.

The analog switch $SW_2$ is connected to the output side of the OP amplifier $U_3$ in the light quantity measuring condition. When an aperture stop fixing command signal a is applied from the system control circuit 8 immediately before the imaging device 3 is brought into the imaging operating condition through the shutter operation, the analog switch $SW_2$ is connected to the output side of the OP amplifier 4. This prevents any abnormal current from flowing into the driving coil of the aperture stop mechanism 16. Numeral 15 designates a level shifter for $SW_2$ control signal which is similar to the level shifter 17.

Numeral 18 designates an aperture stop opening detecting circuit. It detects the open condition of the aperture stop by utilizing the fact that when the aperture stop is left in the open condition, the output of the OP amplifier $U_4$ remains at a high voltage by the reference value $Vref_3$. In fact, it assumes a value which is dependent on the maximum driving current of the OP amplifier 4 and the impedance of the driving coil. In the aperture stop opening detecting circuit 18, a circuit including an OP amplifier $U_6$, resistors $R_{21}$ and $R_{22}$, capacitors $C_4$ and $C_5$, etc., forms a low-pass filter, thereby preventing the detecting circuit 18 from operating erroneously due to a transient response of the aperture stop drive circuit 5. This circuit generates an opening detection signal (low active) c when the output of the OP amplifier 4, which is raised to the high voltage by the reference value $Vref_3$, is continuously generated over a given time by an integrator circuit and a comparator which are provided by an OP amplifier $U_7$. In this way the fact that the aperture stop is in the open condition is detected positively.

The thus detected opening detection signal c is applied to the system control circuit 8 where the signal is used for the purpose of changing the assumed shutter speeds.

Figure 3A:
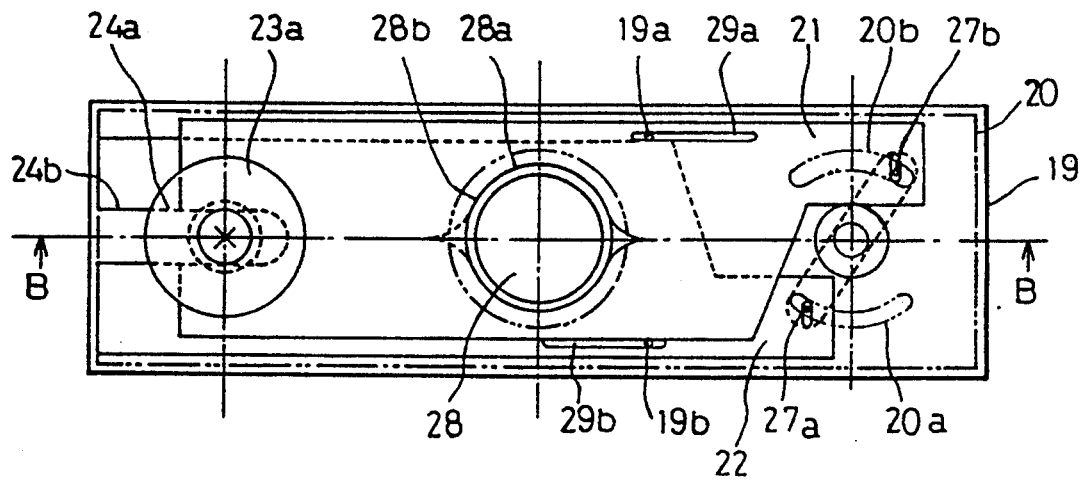
FIGS. 3a and 3b are respectively a front view and a sectional view taken along the line B—B of FIG. 3a showing a specific example of the aperture stop mechanism and the aperture stop fixing unit.
Figure 3B:
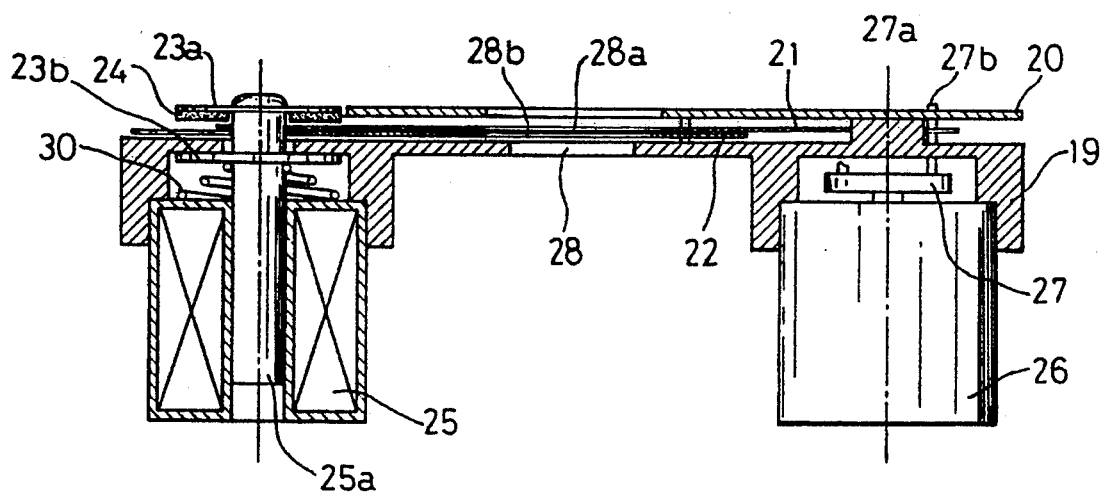

FIG. 3a and 3b show a specific example of the aperture stop fixing mechanism 11. Numeral 26 designates a drive unit for the aperture stop mechanism 2 and it corresponds to the element designated 16 in the circuit diagram of FIG. 2. Numeral 27 designates a link connected to the drive unit 26 and it is provided with two pins 27a and 27b. The pins 27a and 27b are respectively guided in arcuate openings 20a and 20b of a support member 20 thus allowing the link 27 to make a reciprocating rotary motion within a limited range of rotational angles.

Numerals 21 and 22 designate two aperture stop blades respectively having aperture openings 28a and 28b and also they are respectively provided with elongated holes 29a and 29b and slotted holes 24a and 24b. The aperture stop blades 21 and 22 are slidable using as guides for pins 19a and 19b which are projected from a mounting member 19 arranged in fixed relation with the support member 20 and a plunger shaft 25a of an aperture stop fixing solenoid plunger unit 25. The aperture stop blades 21 and 22 are respectively connected to the pins 27a and 27b so that they are slidingly moved in relatively opposite directions by the rotation of the link 27 by the drive unit 26 and the size of the opening of the aperture stop is varied in correspondence with the amount of relative movement.

In the aperture stop mechanism 2, the aperture stop blades 21 and 22 are placed in the controlled positions selected to provide the desired aperture stop opening for the proper exposure through the feedback control by the aperture stop drive circuit 5 (FIGS. 1 and 2). In order to mechanically fixedly hold the aperture stop blades 21 and 22 in these controlled positions prior to the start of the imaging operation, the solenoid plunger unit 25 is provided on the mounting member 19 on the opposite end side to the drive unit 26. A pair of spaced parallel collars 23a and 23b are provided on the upper end portion of the plunger shaft 25a of the solenoid plunger unit 25. In the light quantity measuring condition, the coil of the solenoid plunger unit 25 is deenergized. Thus, the collar 23b is in a lifted position in which it is pressed against the member 19 by a compression spring 30. When the imaging operation is started, the coil of the solenoid plunger unit 25 is energized so that the plunger shaft 25a is withdrawn into the coil against the spring 30 and the other collar 23a fixed to the shaft 25a firmly holds the aperture stop plates 21 and 22 between it and the upper surface of the mounting member 19. Numeral 24 designates cushion member such as a felt which is applied to the lower surface of the collar 23a so as to press the aperture stop blades 21 and 22 without any deviation.

Figure 4:
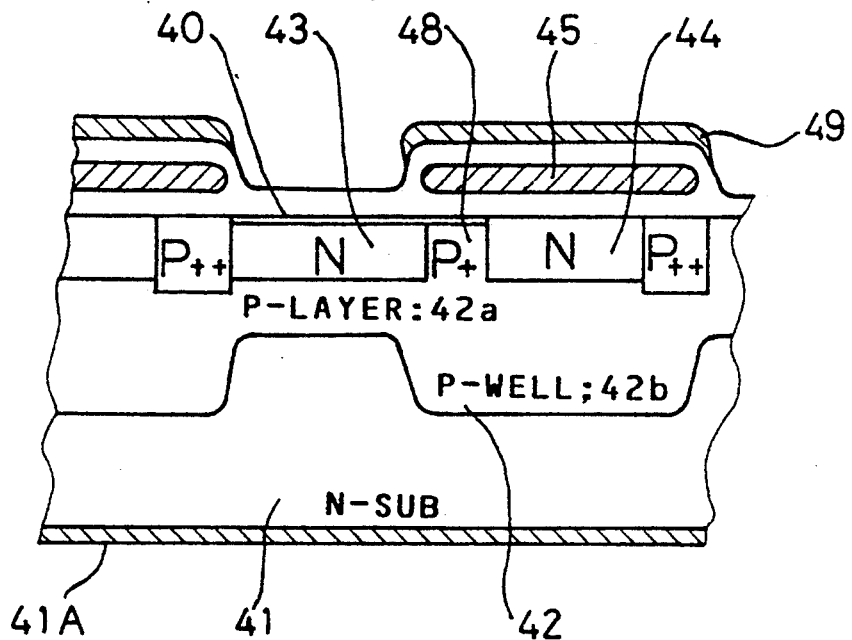
FIG. 4 is an enlarged partial sectional view showing schematically an example of the construction of the CCD imaging device.

Referring now to FIG. 4, there is illustrated the construction of the principal part of the imaging device 3 of the vertical overflow drain structure used in the present embodiment. In the Figure, an electrode 41A is formed on the lower surface side of a substrate 41 made of an n-type silicon. A p-type region 42 is formed on the n-type silicon substrate 41 so that a photoelectric charge storage layer 43 providing photoelectric conversion photosensitive picture elements is formed above a p-layer 42a in the p-region 42 and a vertical transfer register 44 is formed above a p-well 42b in the p-region 42. A transfer gate 48 is formed between the photoelectric charge storage layer 43 and the vertical transfer register 44 and a thin p-layer 40 is formed above the photoelectric charge storage layer 43 and the transfer gate 48. The surface side of the photoelectric charge storage layer 43, the vertical transfer register 44, etc., is covered with an insulator layer consisting of $SiO_2$ so that a transfer register electrode 45 is formed at a position above the vertical transfer register 44 within the insulator layer, and also a light shielding layer 49 is formed on the top surface so as to cover the vertical transfer register 44 and the transfer gate 48.

Figure 5:
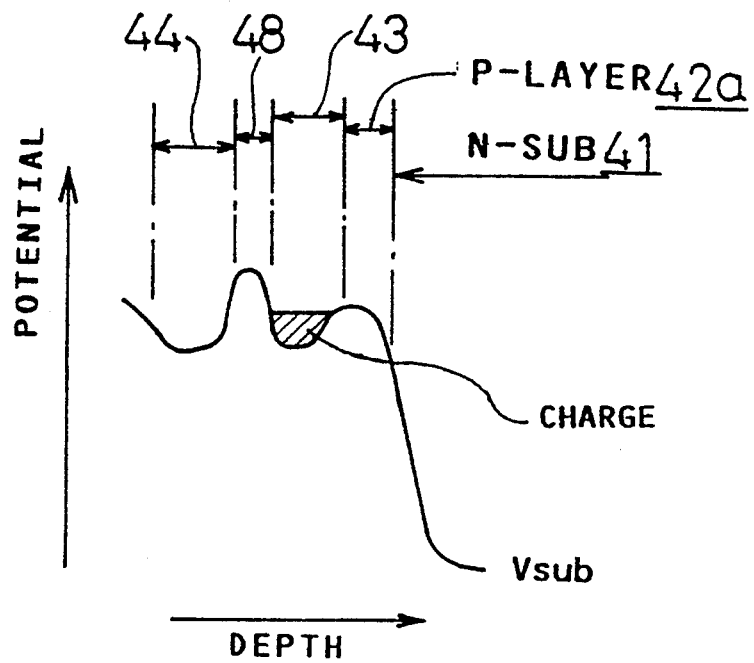
FIG. 5 is a diagram showing schematically the potential distribution when the imaging device is not biased.

With the CCD imaging device constructed as described above, in the imaging operating condition a bias voltage is applied to the electrode 41A on the back of the n-silicon substrate 41 and also a transferring drive pulse is applied to the transfer register electrode 45. In this imaging operating condition the potential distribution becomes as shown in FIG. 5. In other words, the charges produced in the photoelectric charge storage layer 43 under the application of external light are read out to the outside by the transfer register 44, and simultaneously a part of the produced charges which is higher than the potential of the p-layer 42a flows into the n-silicon substrate 41 (overflow drain) at a bias potential Vsub.

On the other hand, in the light quantity measuring operating condition the application of the drive pulse to the vertical transfer register 44 is stopped and also the application of the bias voltage to the n-silicon substrate 41 is stopped, thus bringing the imaging device into the non-operated condition. The charges produced in the photoelectric charge storage layer 43 under the application of light are not read out to the vertical transfer register 44 and therefore the charges overflow in all the photosensitive elements in the light receiving condition or the photoelectric charge storage layer 43. Thus, the resulting photo current flowing into the overflow drain is proportional to the amount of light received at that time.

In this case, however, if some charges remain at any of the electrodes of the imaging device so that even a very small bias is applied to the electrode, a dark current is produced at the depth of the p-region 42 and it flows into the overflow drain, thus making it impossible to accurately measure only the very small photo current flowing out from the photoelectric charge storage layer 43.

Figure 6:
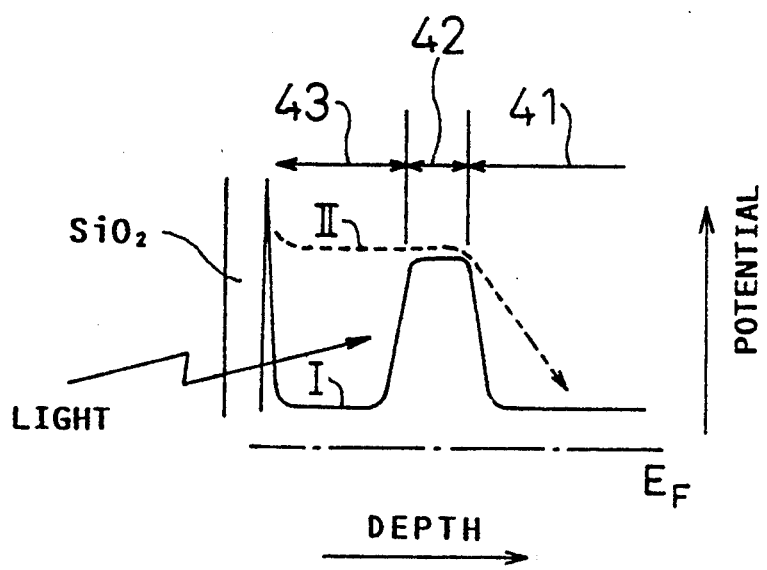
FIG. 6 is a diagram showing schematically the potential distribution when the CCD imaging device is biased.

The discharge circuit 50 (FIG. 1) is provided for the purpose of overcoming this deficiency. If any remaining charges stored in the capacitance portions of the circuits connected directly to the electrodes of the imaging device 3 are rapidly discharged by the discharge circuit 50 prior to the light quantity measurement, the imaging device 3 is placed in a completely stopped condition with no bias voltage being applied. FIG. 6 shows the potential distribution in such non-biased condition.

In FIG. 6, symbol $E_F$ represents the Fermi level in the equilibrium condition where there is no entry of the external light. In the light-shielded condition, the photoelectric charge storage layer 43 is empty of charges and it is at the potential level I in FIG. 6. When light falls externally upon the photoelectric charge storage layer 43 in this condition, the resulting charges are stored up to the higher level II in the photoelectric charge storage layer 43 and any further continued production of charges causes the charges to flow over the p-region 42 into the n-silicon substrate 41 or the overflow drain as shown by the broken line. If the photo current flowing into the overflow drain is measured from the electrode 41A in this condition, the quantity of light received can be detected accurately. While it is of course expected that the charges produced in the photoelectric charge storage layer 43 overflow in the direction of the vertical transfer register 44, the driving for the transferring operation of the register 44 is also completely stopped as mentioned previously and therefore the charges overflowing toward the vertical transfer register side eventually overflow into the overflow drain.

Figures 7A, 7B:
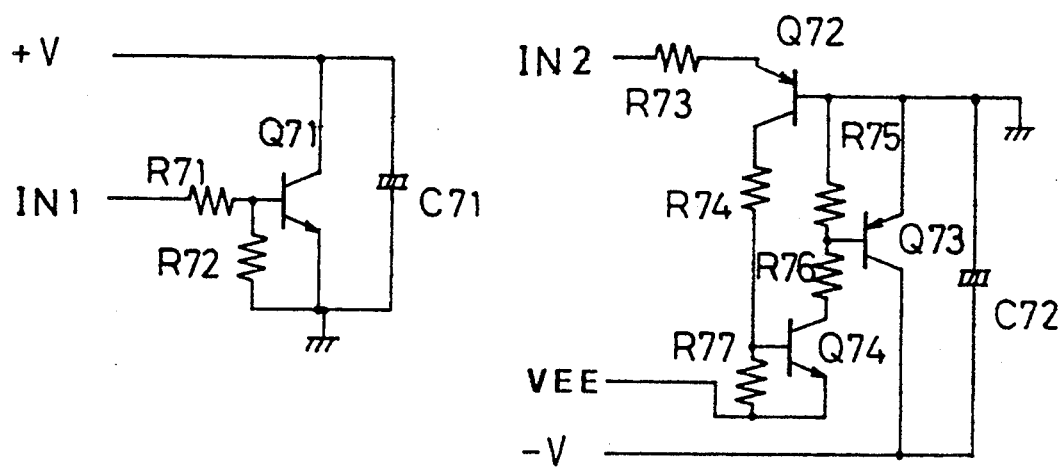
FIGS. 7a and 7b are circuit diagrams showing different specific examples of the discharge circuit.

Specific exemplary circuit constructions of the discharge circuit 50 are shown in FIGS. 7a and 7b. Of these circuit constructions, the discharge circuit of FIG. 7a is one adapted for discharging a capacitance component $C_{71}$ charged to a positive voltage, and the discharge circuit of FIG. 7b is one for discharging a capacitance component $C_{72}$ charged to a negative voltage. In either of these circuits, a transistor is used as the switching element.

Firstly, in the discharge circuit of FIG. 7a a grounded-emitter NPN switching transistor $Q_{71}$ is connected in parallel with the capacitance $C_{71}$ with respect to the positive power supply (the output of the first power circuit 55). In the non-operated condition where no signal is applied to an input terminal $IN_1$ for receiving a discharge command signal, only a very small leakage current flows in the emitter-collector circuit of the transistor $Q_{71}$ and the charges from the positive power supply are stored in the capacitance $C_{71}$. When the positive power supply is cut off prior to the start of the light quantity measuring operation and a command signal (high signal) of a higher voltage than the reference level is applied to the input $IN_1$ from the system control circuit 8, the collector-emitter circuit of the transistor $Q_{71}$ is rendered conductive and the charges stored in the capacitance $C_{71}$ are discharged as a collector current.

On the other hand, the discharge circuit of FIG. 7b is constructed as a level shift circuit utilizing transistors. A PNP switching transistor $Q_{73}$ is connected in parallel with a capacitance $C_{72}$ with respect to the negative power supply (the output of the first power source 55). The potential of a signal applied to its base can be dropped to a desired conduction level through level shifting PNP transistor $Q_{72}$ and NPN transistor $Q_{74}$ and resistors $R_{73}$ to $R_{77}$. The emitter of the transistor $Q_{74}$ is connected to the negative voltage output terminal of the second power circuit 58, thereby maintaining it at a constant negative potential $V_{EE}$.

In this discharge circuit, the application of a high signal to an input $IN_2$ from the system control circuit 8 turns on the level shift transistors $Q_{72}$ and $Q_{74}$. The turning-on of the transistor $Q_{74}$ turns on the transistor $Q_{73}$. As a result, the charges stored in the capacitance $C_{72}$ are discharged as collector current of the transistor $Q_{73}$.

In the embodiment described in connection with FIGS. 1 to 3, the aperture stop opening detection is effected only with respect to the released conditions. In such cases the selection of the shutter times allows the change-over only from a short-seconds time to a long-seconds time so that once the long-seconds time has been set, it is impossible to select the short-seconds shutter speed. There will be no problem if the photographing is limited to such objects involving small variations of the exposure condition in time. However, problems will be caused when successively shooting a plurality of objects involving considerable variations of the exposure condition.

In order to overcome such problems, it is necessary to detect a greater number of subdivided aperture stop openings. Detecting means for such aperture stop openings may be comprised for example of an angular encoder as well as a simple circuit adapted to be incorporated in the camera body and employing a Hall element or magnetic-resistance element for magnetically detecting the angular position of the rotor (or the link 27) of the aperture stop mechanism drive unit 26.

Figure 8:
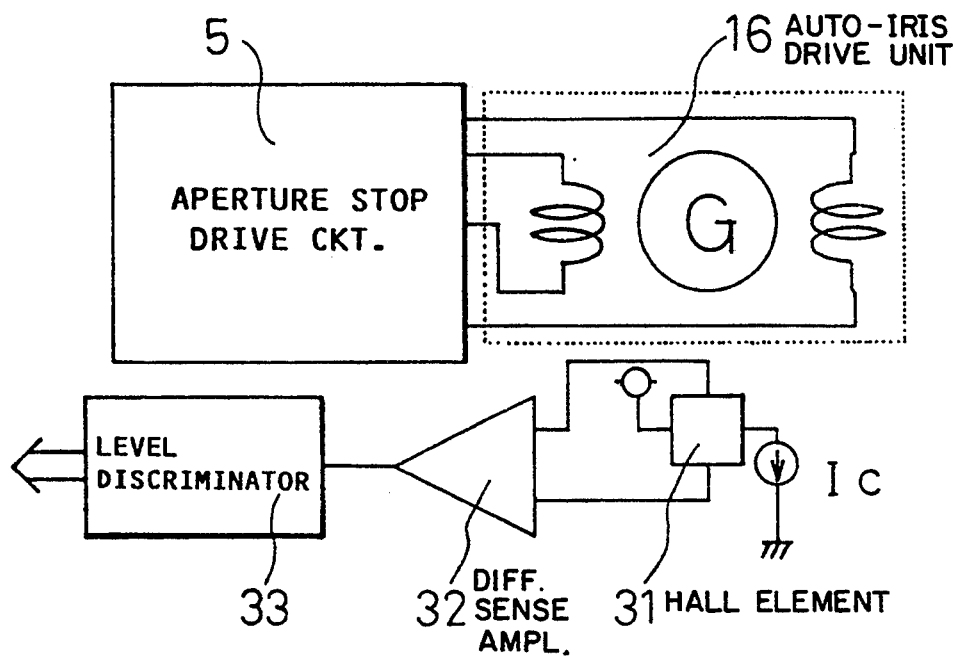
FIG. 8 is a block diagram showing an example of the construction of the aperture stop opening detecting circuit and the aperture stop drive circuit.

Referring now to FIG. 8, there is illustrated an example of detecting means employing a Hall element to effect the aperture stop opening (position) detection. In this case, a Hall element 31 is provided for detecting the rotational angular position of the rotor of the aperture stop mechanism (the auto-iris unit 16) driven by the aperture stop drive circuit 5. The Hall voltage VH generated from the Hall element 31 is amplified by a differential sense amplifier 32 and its voltage level is discriminated by a level discriminator 33. The result of the discrimination is sent as an aperture stop opening detection signal to the system control circuit 8 from the discriminator 33. It is to be noted that the Hall element 31 is driven with a constant current.

Figure 9:
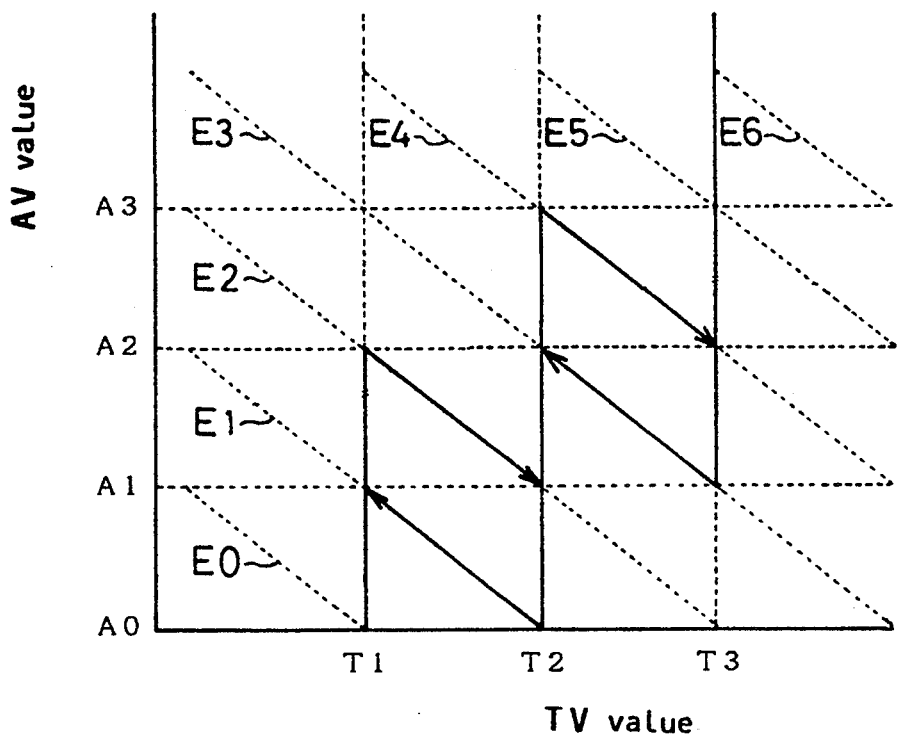
FIG. 9 is a graph showing the correlation between the shutter time and the aperture stop opening for explaining the exposure control in the embodiment.

Referring now to FIG. 9, there is illustrated an example of a control diagram for effecting the change-over from one shutter time to another in accordance with the result of the aperture stop opening detection in the exposure control. This example shows a case in which four different opening threshold values $A_0$ to $A_3$ including the opening of the aperture stop are set with respect to the aperture stop opening detection values and three different shutter times $T_1$, $T_2$ and $T_3$ are set. In the Figure, the abscissa (shutter speed TV) represents the shutter time tending to become shorter (the shutter speed tending to increase) toward the right side and the ordinate (aperture stop value AV) represents the aperture stop opening tending to decrease (the aperture stop value AV tending to increase) toward the upper side. Oblique broken lines $E_0$ to $E_6$ show some equal exposure characteristic straight lines and the exposure conditions are maintained in the equal condition on the same characteristic straight line.

In the exposure control, if, for example, the initial value of the assumed shutter time is set to $T_2$, when the auto-iris operation is effected by the aperture stop drive unit so that the aperture stop opening is stopped down from $A_3$, in response to the detection signal from the aperture stop opening detecting unit (FIG. 8) the system control circuit 8 changes over the auto-iris operation to a control condition where the shutter time $T_3$ is selected on the equal exposure straight line $E_4$ and the feedback control of the aperture stop is effected again from for example the condition of the aperture stop opening $A_2$ with the changed-over shutter time $T_3$. On the contrary, where the aperture stop opening is opened up to the wide-open condition of $A_0$, in response to the detection signal from the aperture stop opening detection unit (FIG. 8) the system control circuit 8 changes over the auto-iris operation to a control condition where the shutter time $T_1$ is selected on the equal exposure straight line $E_1$ and the feedback control of the aperture stop is effected again from for example the condition of the aperture stop opening $A_1$ with the changed-over shutter time $T_1$. This shutter time change-over operation is provided with a hysteresis from the control point of view so that during the control following the change-over of the shutter time from for example $T_2$ to $T_3$ on the equal exposure straight line $E_4$, after the exposure control has been restarted from the aperture stop opening $A_2$, the control condition is not changed over toward the shutter time $T_2$ on the equal exposure straight line $E_4$ even if the aperture stop opening again becomes $A_2$ and the change-over from the shutter time $T_3$ to $T_2$ is effected on the equal exposure straight line $E_3$ only when the aperture stop opening becomes $A_1$ with the shutter time $T_3$. Similarly, even during the control following the change-over from the shutter time $T_2$ to $T_1$ on the equal exposure straight line $E_1$, after the exposure control has been restarted from the aperture stop opening $A_1$, the control condition is not changed over toward the shutter time $T_2$ on the equal exposure straight line $E_1$ even if the aperture stop opening again becomes $A_1$ and the change-over from the shutter time $T_1$ to $T_2$ is effected on the equal exposure straight line $E_2$ only when the aperture stop opening becomes $A_2$ with the shutter time $T_1$. By thus providing the control characteristics with hystereses, the exposure condition is prevented from becoming unstable. Also, by performing the exposure control combined with this aperture stop control unit (so-called auto-iris), the exposure itself can be performed accurately even if the required aperture stop opening detection information for the execution of the shutter time change-over is somewhat inaccurate within the hysteresis range.

Figure 10:
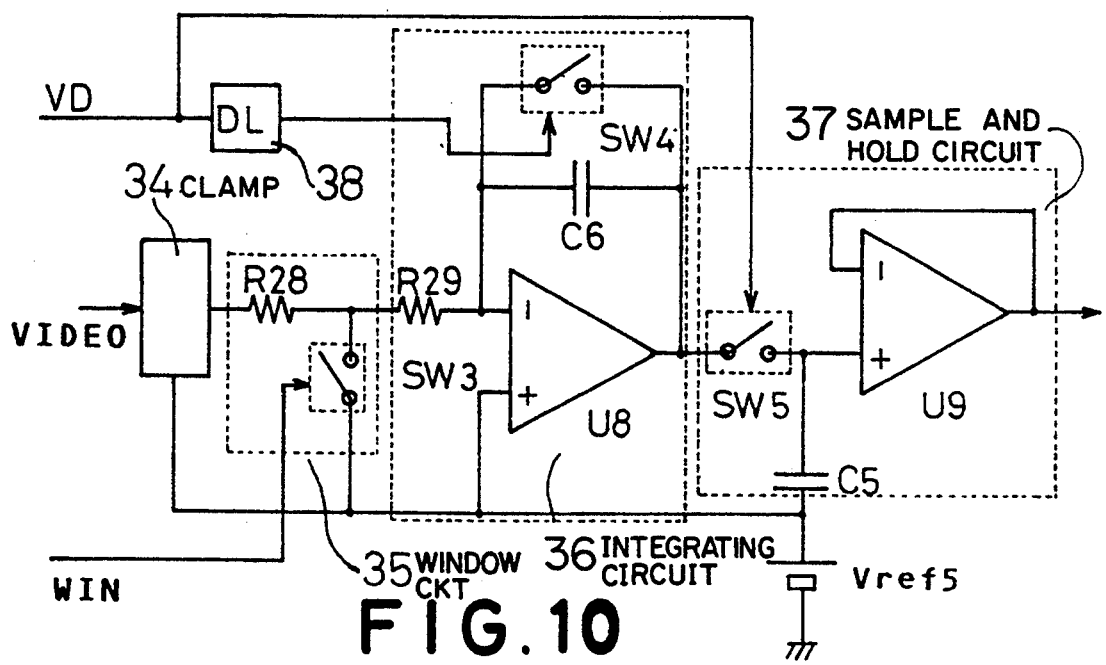
FIG. 10 is a circuit diagram showing a specific example of the picture signal level detecting circuit.

Referring now to FIG. 10, there is illustrated a circuit diagram showing an example of a specific construction of the principal part of the video level detecting circuit 10. The video output signal (VIDEO) generated from the video signal processing circuit 6 (FIG. 1) is applied to a clamp circuit 34 in the video level detecting circuit 10 and the level of its dc component is clamped at a reference voltage $Vref_5$. Of the output signal from the clamp circuit 34, the signal portion corresponding only to a portion of the picture (usually including the central portion of the picture) is separated and passed at the same level by a window circuit 35 and the signal corresponding to the other portion is adjusted to a level equal to the reference voltage $Vref_5$. This separation of the signal according to the position within the picture is effected by applying a window signal WIN to an analog switch $SW_3$ from the system control circuit 8. The analog switch $SW_3$ receives from the system control circuit 8 the window signal WIN which is synchronized with the reading of the video signal from the imaging device 3 so that the analog switch $SW_3$ is opened when the video output signal of the picture central portion, which is to be separated, is generated from the video signal processing circuit 6 and it is closed in other circumstances thereby holding the output level at the reference voltage $Vref_5$. An integrating circuit 36 for integrating the output of the analog switch SW₃ is reset in response to the closing of another analog switch SW₄. The analog switch SW₄ is controlled by a delayed signal from a delay circuit 38 which delays a vertical synchronizing pulse VD applied from the system control circuit 8. When the analog switch SW₄ is open, the integrating circuit 36 integrates the video output signal from the window circuit 35 and therefore the output from the integrating circuit 36 corresponds to the magnitude of the video output signal of the selected portion of the picture at that time. Numeral 37 designates a sample-and-hold circuit whereby the video output signal integrated by the integrating circuit 36 is sampled by the vertical synchronizing signal VD through an analog switch SW₅ thereby generating a DC voltage as video level detection information for one picture. In the case of this circuit construction, the resetting of the integrating circuit 36 must be effected after the sample-and-hold operation has been effected satisfactorily. The output signal from the sample-and-hold circuit 37 is compared with the preliminarily stored proper exposure information within the system control circuit 8 so as to determine whether the exposure is proper.

Where such video level detecting circuit is used, when an improperly exposed picture is imaged due for example to a rapid change in the exposure condition, the improper exposure is detected within the system control circuit 8 in accordance with the output signal from the video level detecting circuit 10 and further the exposure control condition is corrected to a condition corresponding to the shutter time which should be proper in the then current exposure condition, thereby performing again the imaging operation and successively producing properly exposed pictures.

In the foregoing description, the imaging device for ordinary television cameras is applied to an electric still picture camera. Where an imaging device having an overflow drain divided into a plurality of regions within an imaging picture is used for still picture imaging purposes, it is sufficient to separately provide for example such photometer circuit as the photometer circuit 4 of FIG. 2 for each of the overflow drains. The outputs from these circuits are mixed with suitable mixing ratios to generate the resulting value as a measured light quantity output. In this case, it is possible to obtain the accurate exposure suitable for a still picture by effecting the previously mentioned aperture stop control based on the measured light quantity information. Therefore, there is no need to correct the exposure by the video level detecting circuit 10.

Figure 11:
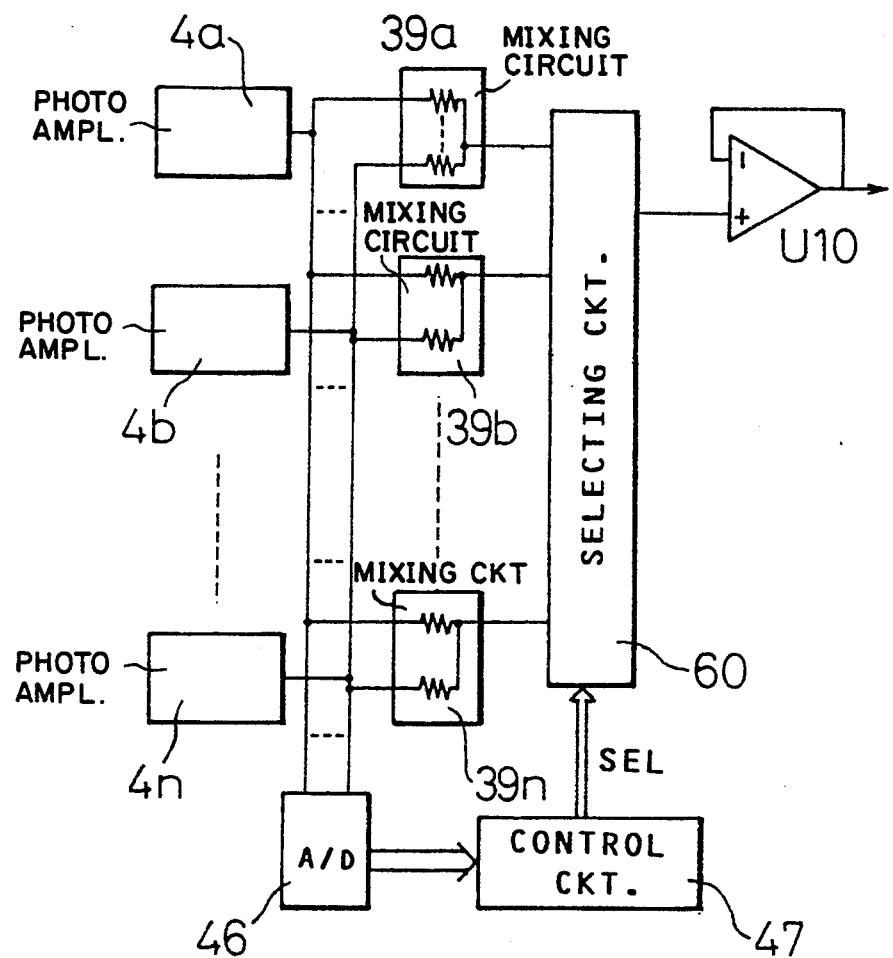
FIG. 11 is a block diagram showing an example of a circuit construction for effecting the mixing and selection of photometer output signals in a case employing for light quantity measuring purpose an imaging device having an overflow drain divided into a plurality of parts within an imaging surface.

Also, in this case, by changing the mixing ratio in accordance with the magnitude of the output of each of the photometer circuits, it is possible to change the exposure condition to the optimum condition in accordance with the condition of the object. FIG. 11 shows an example in which an imaging device having such an overflow drain of the region dividing type so as to select the mixing ratio of each measured light quantity output. In FIG. 11, the outputs of photometer amplifiers 4a to 4n corresponding to the measured light quantity signals from the divided overflow drains are each applied to and mixed in each of resistor mixing circuits 39a to 39n. The resistor mixing circuits 39a to 39n are different in signal mixing ratio from one another and each of them represents one of the several conditions of various objects which are classified experimentally.

The analog outputs from the photometer amplifiers 4a to 4n are converted to a digital signal by an A/D converter 46 and the digital signal is applied to a control circuit 47 which in turn generates a control signal SEL for selecting one or more of the outputs from the mixing circuits 39a to 39n. The control signal SEL is applied to a multiplexer 60 so that the multiplexer 60 selects for example one of the outputs from the mixing circuits 39a to 39n in accordance with the content designated by the control signal SEL and the selected mixing circuit output is supplied as a control signal to the aperture stop drive circuit 5 (FIG. 1).

By performing such control, the exposure condition is controlled under the exposure condition suited for a still picture or under the exposure condition desired by the photographer.

What is claimed is:

1. In a still picture imaging apparatus including a CCD imaging device having an overflow drain, photometer means for measuring a photo current flowing into the overflow drain of said imaging device, aperture stop means for controlling the quantity of light incident to said imaging device, and command means for generating a command signal to make a start of imaging operation of said imaging device whereby, with driving of said imaging device for said imaging operation being stopped, measurement of light quantity by said photometer means is effected and then the driving for said imaging operation of said imaging device is started in response to the command signal from said command means, the improvement comprising:

aperture stop control means for feedback-controlling said aperture stop means in accordance with a measured light quantity signal generated from said photometer means in such a manner that said measured light quantity signal becomes equal to a reference value representing an incident light quantity which provides a proper exposure when said imaging device is exposed to incident light over a predetermined shutter time;

aperture stop fixing means for mechanically fixing an aperture stop opening of said aperture stop means controlled by said aperture stop control means immediately before said imaging device starts the imaging operation in accordance with the command signal from said command means; and output control means for outputting from said imaging device a video output signal imaged with said predetermined shutter time after said aperture stop opening has been fixed.

2. A still picture imaging device according to claim 1, further comprising discharge means for forcibly discharging charges stored in capacitance portions of circuits connected to said imaging device when the imaging operation of said imaging device is stopped.

3. In a still picture imaging apparatus including a CCD imaging device having an overflow drain, photometer means for measuring a photo current flowing into the overflow drain of said imaging device, aperture stop means for controlling the quantity of light incident to said imaging device, and command means for generating a command signal to make a start of imaging operation of said imaging device whereby, with driving of said imaging device for said imaging operation being stopped, measurement of light quantity by said photometer means is effected and then the driving for said imaging operation of said imaging device is started in response to the command signal from said command means, the improvement comprising:

aperture stop control means for feedback-controlling said aperture stop means in accordance with a measured light quantity signal generated from said photometer means in such a manner that said measured light quantity signal becomes equal to a reference value representing an incident light quantity which provides a proper exposure when said imaging device is exposed to incident light over a predetermined shutter time;

aperture stop fixing means for mechanically fixing an aperture stop opening of said aperture stop means controlled by said aperture stop control means immediately before said imaging device starts the imaging operation in accordance with the command signal from said command means; and output control means for outputting from said imaging device a video output signal imaged with said predetermined shutter time after said aperture stop opening has been fixed; said apparatus further comprising aperture stop opening detecting means for detecting the aperture stop opening of said aperture stop means, wherein said aperture stop control means is provided with a plurality of predetermined light quantity reference values each corresponding to the incident light quantity which provides said proper exposure when said imaging device is exposed to said incident light over one of a plurality of predetermined shutter times, wherein said aperture stop control means includes selecting means for changing over said shutter times from one of said plurality of predetermined shutter times to another one of said plurality of predetermined shutter times in accordance with an output of said aperture stop opening detecting means when said aperture stop control means adjusts the opening of said aperture stop means so as to satisfy one of said plurality of light quantity reference values selected in correspondence to said one of said plurality of predetermined shutter times, wherein said aperture stop means is adapted such that when said aperture stop opening detecting means generates the output the aperture stop opening of said aperture stop means is controlled in such a manner that said measured light quantity signal corresponds to newly selected one of said light quantity reference values which provides said proper exposure with newly changed-over predetermined shutter time, and wherein said output control means is adapted to perform an operation of outputting from said imaging device the video output signal imaged with said newly changed-over predetermined shutter time.

4. A still picture imaging device according to claim 1, further comprising signal level detecting means for detecting from said video output signal the magnitude of the video output signal corresponding to at least part of an imaged picture, and shutter time correcting means whereby said shutter time is used as such when a detected value of said signal level detecting means is within a predetermined proper exposure range and said shutter time is corrected to bring said detected value into said proper exposure range when said detected value is beyond said proper exposure range, and wherein said output control means is adapted to output from said imaging device the video output signal imaged with said corrected shutter time.

* * * * *